United States Patent [19]
Stewart

[11] 3,771,039
[45] Nov. 6, 1973

[54] BATTERY CHARGING CIRCUIT FOR SUBSCRIBER CARRIER EQUIPMENT
[75] Inventor: James A. Stewart, Menlo Park, Calif.
[73] Assignee: GTE Automatic Electric Laboratories Incorporated, Northlake, Ill.
[22] Filed: Mar. 1, 1972
[21] Appl. No.: 230,620

[52] U.S. Cl..................... 320/2, 179/2.5 R, 320/21, 323/DIG. 1, 323/4
[51] Int. Cl............................. G05f 1/56, H02j 7/06
[58] Field of Search ..................... 320/22, 21, 11, 6, 320/2; 323/4, DIG. 1; 179/2.5 R

[56] References Cited
UNITED STATES PATENTS
3,670,233  6/1972  Zellmer et al. ............ 323/DIG. 1 X
3,506,910  4/1970  Bevis........................................ 323/4
3,629,681  12/1971  Gurwicz............................ 320/21 X FOREIGN PATENTS OR APPLICATIONS
1,166,867  10/1969  Great Britain........................ 320/11

OTHER PUBLICATIONS
"Two Switching Regulators for Battery Powered Systems" S. W. Billingsly et al. EDN/EEE Feb. 15, 1972, pp. 40–43.

Primary Examiner—J. D. Miller
Assistant Examiner—Robert J. Hickey
Attorney—K. Mullerheim et al.

[57] ABSTRACT
This charging circuit is a two-port network with an input port connected through a cable pair to a central office talking battery, and an output port connected across a local subscriber battery. The charging circuit comprises a current sensing resistor, a switching transistor, and an inductor connected in series with the talking battery and the local battery through the lines of the cable pair; a commutating diode connected across the series combination of the inductor and the local battery; a first control transistor for driving the switching transistor and having its base electrode regeneratively coupled to the collector electrode of the switch through the parallel combination of a diode and a capacitor; and, a second control transistor having its base-emitter junction connected across the resistor and having its collector electrode connected to the base electrode of the switch. The transistor switch alternately connects the inductor and the local battery to and disconnects them from the talking battery during charging of the local battery. When the switch is closed, the inductor stores energy while the local battery receives a charging current from the talking battery. When the switch is open, the magnetic field on the inductor collapses to provide a current through the commutating diode for charging the local battery. The second transistor compares the magnitude of the charging current that is drawn from the office battery and is sensed by the resistor with the reference voltage set by the base-emitter junction turn-on voltage of the second control transistor for driving the transistor switch out of saturation and controlling the operation of the latter in order to draw a relatively constant current from the talking battery.

8 Claims, 1 Drawing Figure

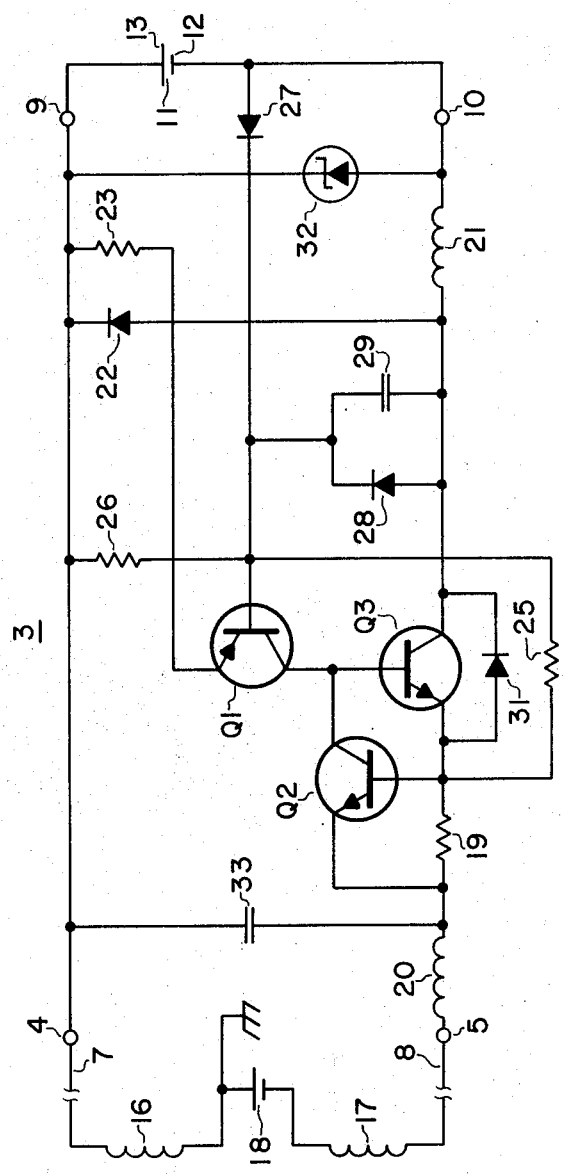

BATTERY CHARGING CIRCUIT FOR SUBSCRIBER CARRIER EQUIPMENT

BACKGROUND OF THE INVENTION

This invention relates to subscriber carrier equipment for telephone communications and more particularly to circuitry utilizing a central office talking battery for charging a local battery in self-contained subscriber carrier equipment that is at a location remote from the central office.

Early self-contained subscriber carrier equipment for use at subscriber facilities and utilizing its own local battery power was unsatisfactory since the local battery was not recharged and therefore had to be replaced frequently. A prior art circuit for charging the subscriber battery includes current limiting resistors connected between the line talking battery and the subscriber battery for continuously applying a trickle charge current to the latter. As is well known, the respective pick-up and drop-out values of line current on the cable pair from the central office to the remote subscriber equipment for which the A or pulsing relay contacts close and open are approximately 16 and 6 milliamperes. The resistors in this charging circuit cause the subscriber battery charging current on the cable pair to be at all times less than the 6 mA drop-out value, e.g. 4 mA, to assure that the pulsing relay contacts will open at the start of a dial pulse. A continuous 4 mA trickle charge current through a low voltage local battery is insufficient to keep the local battery charged under moderate usage of the subscriber carrier telephone.

An object of this invention is the provision of an improved circuit for charging the local subscriber battery from the central office talking battery.

Another object is the provision of an improved circuit for charging a local subscriber battery from the central office talking battery with a battery charging current that is greater than the A-pulsing relay drop-out value while drawing a line current on the cable pair that is less than this value.

DESCRIPTION OF THE PREFERRED EMBODIMENT

Referring now to the drawing which is a schematic circuit diagram of a preferred embodiment of this invention, charging circuit 3 has an input port with terminals 4 and 5 which are connected to lines 7 and 8 of a cable pair and an output port with terminals 9 and 10 which are connected to a local subscriber carrier battery 11. The cable pair connects the charging circuit 3 of a subscriber carrier terminal through the A-pulsing relay windings 16 and 17 of a central office to the 48-volt talking battery 18 which provides power for charging the local subscriber battery 11. The line 7 of the cable pair is grounded.

Charging circuit 3 comprises first and second control transistors Q1 and Q2, respectively, and a switching transistor Q3. The respective emitter and collector electrodes of switching transistor Q3 are connected through resistor 19 and inductor 20 to input terminal 5 and through inductor 21 to output terminal 10. Resistor 19 senses the level of the charging current that is alternately passed to the local battery 11 through Q3 which is essentially a series switch. Inductor 21 is responsive to current passed by Q3 for storing energy which is employed to charge the local battery 11 when the switching transistor is cut off. Diode 22 is connected across inductor 21 and local battery 11 for commutating current passed by the inductor 21 for charging the local battery when Q3 is cut off.

The collector and emitter electrodes of the first control transistor Q1 are connected to the base electrode of Q3 and through resistor 23 to the positive terminal 13, respectively, of local battery 11. The Q1 base electrode is connected through resistor 25 to the Q3 emitter electrode; through resistor 26 to input terminal 4; through diode 27 to the negative terminal 12 of the local battery 11; and, through the parallel combination of diode 28 and capacitor 29 to the Q3 collector electrode. A clamping diode 31 is connected across the emitter-collector junction of Q3.

Resistor 25 ensures start-up of the charging circuit 3. The resistor 23 limits the amount of current drawn by Q1 during turn-on thereof. Diode 27 clamps the Q1 base electrode to the local battery voltage during conduction of Q1 in order to provide a constant base drive to the switching transistor Q3. Capacitor 29 is a feedback element that aids in speeding up the operation of Q1 and Q3 when they are changing operating states.

Diode 28 clamps the Q1 base voltage to 0 volts during conduction of commutating diode 22 to maintain Q1 cut off until the commutating current reaches zero and the enrgy in the magnetic field of inductor 21 is transferred to local battery 11. Diode 31 protects Q3 from being damaged by negative voltage transients occurring when Q3 is cut off. Positive voltage transients occurring during this time interval are limited by diode 22. Zener diode 32 that is connected across output terminals 9 and 10 limits the output voltage of circuit 3 to be no greater than the breakdown voltage of this diode. In this manner, diode 32 protects circuit components having low voltage ratings form being damaged if the talking battery 18 is inadvertantly connected to charging circuit 3 when the local battery 11 is not connected thereto.

Transistor Q3 switches on and off during charging of the local battery 11. In practice, the switching transistor may open and close at a rate such that it appears like a pulse generator having a pulse repetition frequency of approximately 100 KHz. The series inductor 20 and a capacitor 33 that is connected across the input terminals 4 and 5 comprise a low-pass filter for preventing the high frequency signal produced by switching Q3 on and off from getting onto the cable pair lines 7 and 8. Alternatively, inductor 20 may be a resistor.

The repetition frequency at which the switching transistor Q3 operates is a function of the inductance of inductor 21, the local battery 11 voltage, the line voltage across input terminals 4 and 5, and the value of resistor 19. The circuit 3 is designed to operate at a pulse repetition frequency having a nominal value with an input line voltage of 40 volts. When this input voltage decreases, the pulse repetition frequency of the circuit also decreases since it takes longer to build up a current in coil 22. By emperically adjusting the value of resistor 26, changes in the input voltage can be compensated to make the circuit oscillate at a frequency equal to, or greater than, the nominal frequency.

The emitter-base junction of the second control transistor Q2 is connected across the resistor 19 which senses the current from the talking battery that charges the local battery. The Q2 collector electrode is connected to the Q3 base electrode. When the voltage across the current sensing resistor 19 exceeds the turn-on voltage, which is a reference voltage, of the Q2 base-emitter junction during conduction of the switching transistor, Q2 conducts and biases Q3 so as to drive it out of saturation.

In operation, when the talking battery voltage is connected to the input terminals 4 and 5, current through resistors 25 and 26 forward biases the Q1 base electrode to turn Q1 on. Conduction of Q1 also turns Q3 on so that the collector voltage of the latter is approximately equal to the talking battery voltage. This voltage is reflected across capacitor 29 to the Q1 base electrode to regeneratively turn on Q1 and Q3. This voltage also causes diode 27 to conduct to clamp the Q1 base voltage to the local battery 11 voltage so that a measured charge of electricity flows into Q3 driving it into saturation since at turn-on the Q3 collector current is zero because immediately prior to conduction of Q3 the inductor 21 current is zero. Sufficient charge must be provided to keep Q3 saturated until the turn-off thereof is initiated by Q2 so that power lost in the power switch Q3 is minimized and efficiency is maximized. Capacitor 29 charges toward the talking battery voltage during conduction of Q1 and Q3.

The magnetic field builds upon inductor 21 as the charging current therethrough increases linearly. When the charging current through Q3 increases to a value such that the voltage across the current sensing resistor 19 exceeds the Q2 base-emitter junction turn-on voltage (which is the reference voltage), this transistor conducts to force Q3 out of saturation and turn it off. Current flow through the inductor 21 is switched to the commutating diode 22 and Q1 is turned off.

Capacitor 29 discharges through resistor 26 and diode 22 during conduction of the latter. If the capacitor 29 is fully discharged while diode 22 is conducting, Q1 and Q3 may conduct and waste energy therein. Diode 28 is employed to prevent this. When capacitor 29 is fully discharged and the Q1 base voltage is approximatley 0 volts, the diode 28 conducts to clamp the Q1 base electrode at this voltage. As long as current from the collapsing magnetic field on inductor 21 flows through the commutating diode 22, Q1 is reverse biased and cut off. When current through inductor 21 decreases sufficiently to cut off diode 22, current again flows through resistors 25 and 26 and the cycle is repeated.

By way of example, in an embodiment of circuit 3 that was built and tested with an input voltage of 48 volts across input terminals 4 and 5 and a 7 volt local battery, the line current applied to the input terminals 4 and 5 and 3.75 milliamperes whereas the charging current from the output terminals 9 and 10 was 20 milliamperes.

What is claimed is:

1. A two-port network for charging a local battery in a subscriber carrier terminal of a telephone system from a central office talking battery that is connected across the lines of a cable pair comprising:

an input port including a pair of terminals for connection to the cable pair;
an output port including a pair of terminals for connection to the local battery;
an inductor;
a first switching transistor having an emitter electrode connected to one input terminal, having a collector electrode connected through said inductor to one output terminal, and having a base electrode;
a second control transistor having a collector electrode connected to said first transistor base electrode, and having emitter and base electrodes; conduction of said second transistor driving said first transistor into conduction and saturation;
means connecting said second transistor emitter electrode to the other input and output terminals and connecting said second transistor base electrode to said first transistor collector electrode and inductor;
said first transistor being alternately conducting and nonconducting for selectively passing a charging current through said first transistor and inductor for building up a magnetic field on the latter;
a first commutating diode connected between said first transistor collector electrode and the other output terminal for commutating current from said inductor when said first transistor is nonconducting; and
means responsive to charging current through said first transistor during saturation thereof and conduction of said second transistor for selectively driving said first transistor out of saturation and into cut-off, said connecting means coupling the voltage induced by the collapsing magnetic field on said inductor to said second transistor base electrode for rendering said second transistor nonconducting after cut-off of said first transistor.

2. The network according to claim 1, wherein said last-named driving means comprises a resistor in the connection of said first transistor emitter electrode to said one input port for monitoring charging current through the first transistor and a third control transistor having its base-emitter junction connected across said resistor and having a collector electrode connected to said first transistor base electrode, said third transistor conducting to drive said first transistor out of saturation when the voltage across said resistor exceeds the turn-on voltage of the third transistor base-emitter junction.

3. The network according to claim 2 wherein said connecting means comprises a capacitor regeneratively coupling said first transistor collector electrode to said second transistor base electrode.

4. The network according to claim 3 wherein said connecting means comprises a second diode connected in parallel with said capacitor.

5. A two-port network for charging a local battery in a subscriber-carrier terminal of a telephone system from a central office talking battery that is connected across the lines of a cable pair comprising:

an input port including a pair of terminals for connection to the cable pair;
an output porting including a pair of terminals for connection to the local battery;
an inductor;
a first switching transistor having an emitter electrode connected to one input terminal, having a collector electrode connected through said inductor to one output terminal, and having a base electrode;
a second control transistor having a collector electrode connected to said first transistor base electrode for driving said first transistor, and having emitter and base electrodes;

means connecting said second transistor emitter electrode to the other input and output terminals, said connecting means comprising a first capacitor regeneratively coupling said first transistor collector electrode to said second transistor base electrode and a first diode connected in parallel with said first capacitor;

said first transistor being alternately conducting and nonconducting for selectively passing a charging current through said first transistor and inductor for building up a magnetic field on the latter;

a second commutating diode connected between said first transistor collector electrode and the other output terminal for commutating current from said inductor when said first transistor is nonconducting;

means responsive to charging current through said first transistor for selectively driving said first transistor out of saturation prior to rendering of said first and second transistors nonconducting during collapse of the magnetic field on said inductor, said driving means comprising a first resistor in the connection of said first transistor emitter electrode to said one input port for monitoring charging current through the first transistor, and a third control transistor having its base-emitter junction connected across said first resistor and having a collector electrode connected to said first transistor base electrode, said third transistor conducting to drive said first transistor out of saturation when the voltage across said first resistor exceeds the turn-on voltage of the third transistor base-emitter junction; and a third clamping diode connected between said second transistor base electrode and said one output terminal.

6. The network according to claim 5 including a low-pass filter connected across said input port and a second resistor connecting said second transistor base electrode to said other output terminal for causing the pulse repetition frequency at which said first transistor is rendered conducting and nonconducting to be greater than a nominal value which is greater than the upper cut-off frequency of said filter.

7. The network according to claim 6 including a third start-up resistor connected between said first transistor emitter electrode and said second transistor base electrode.

8. The network according to claim 7 including a Zener diode connected across said output port for limiting the output voltage of the network.

* * * * *